No. 794,018. PATENTED JULY 4, 1905.
J. C. HUGHES.
TURNING GEAR FOR VEHICLES.
APPLICATION FILED APR. 12, 1905.

3 SHEETS—SHEET 3.

Witnesses
Ruth J. Mitchell
Edwin E. Krooman

Inventor
John C. Hughes
By Mason, Fenwick Lawrence
Attorneys

No. 794,018.

Patented July 4, 1905.

UNITED STATES PATENT OFFICE.

JOHN C. HUGHES, OF SOUTH OMAHA, NEBRASKA.

TURNING-GEAR FOR VEHICLES.

SPECIFICATION forming part of Letters Patent No. 794,018, dated July 4, 1905.

Application filed April 12, 1905. Serial No. 255,129.

*To all whom it may concern:*

Be it known that I, JOHN C. HUGHES, a citizen of the United States, residing at South Omaha, in the county of Douglas and State of Nebraska, have invented certain new and useful Improvements in Turning-Gears for Vehicles; and I do hereby declare the following to be a full, clear, and exact description of the invention, such as will enable others skilled in the art to which it appertains to make and use the same.

This invention relates to improvements in turning-gears for vehicles, and particularly to short-turning gears for motor-vehicles.

One of the objects of the invention is the construction of a running-gear for a vehicle which is capable of having its front wheels tilted as well as turned to different positions synchronously with the tilting of the rear wheel.

Another object of the invention is the provision of means for vertically and longitudinally adjusting the stub-axles of the front wheels synchronously with the vertical adjustment of the rear axle.

A further object of the invention is the provision of peculiarly-constructed guiding means which is capable of tilting all of the wheels of the running-gear.

A still further object of the invention is the provision of peculiarly-constructed guiding means for moving the wheels of the running-gear.

With these and other objects in view the invention consists of certain other novel constructions, combinations, and arrangements of parts, as will be hereinafter fully described, illustrated in the accompanying drawings, and more particularly pointed out in the claims hereto appended.

Figure 1:
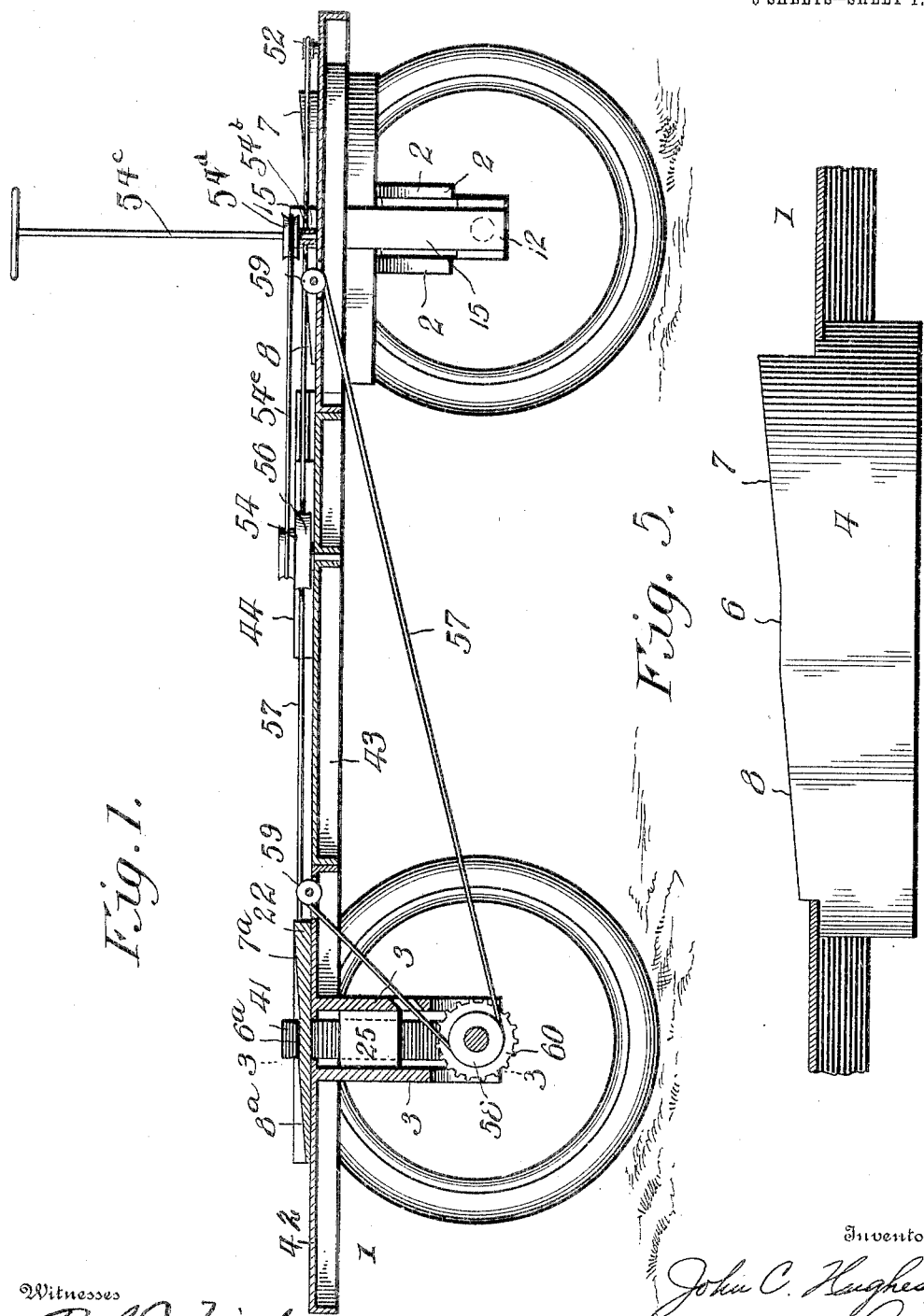
Figure 2:
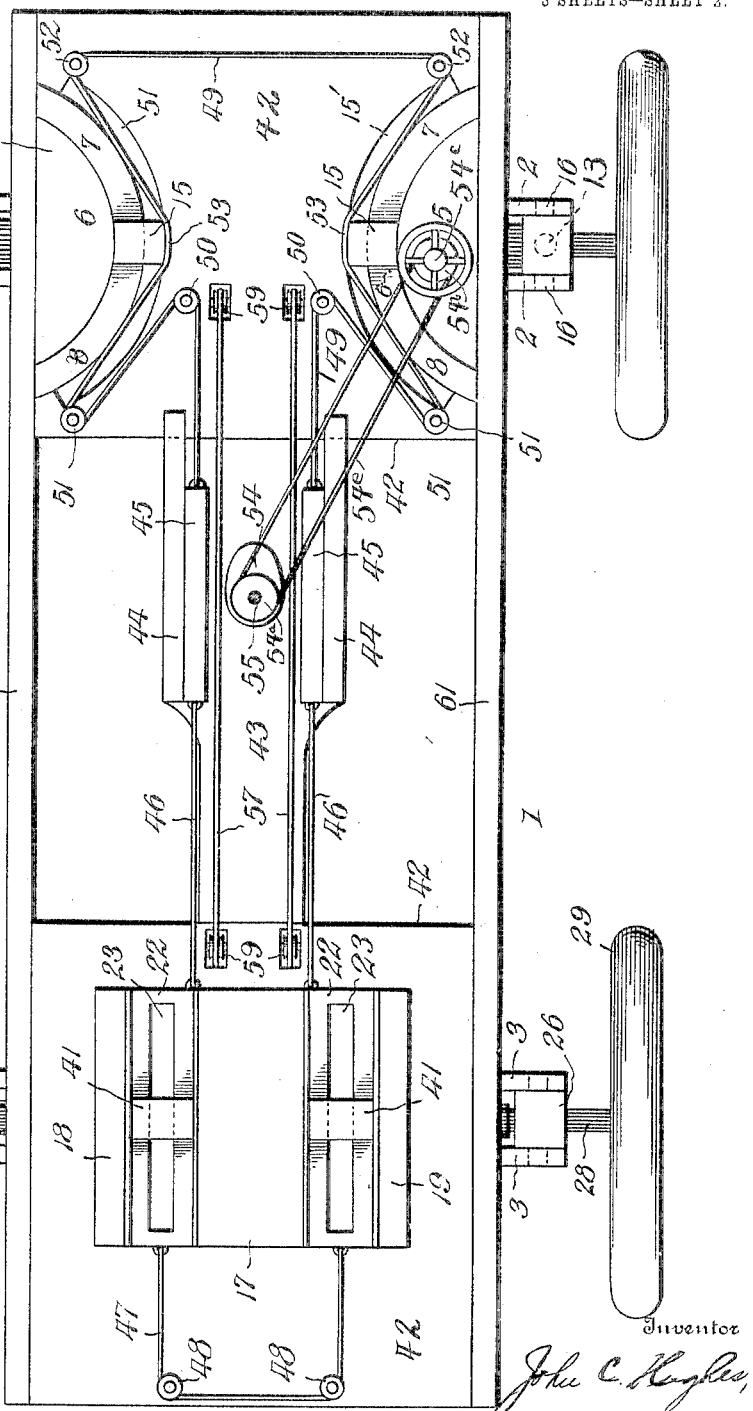
Figure 3:
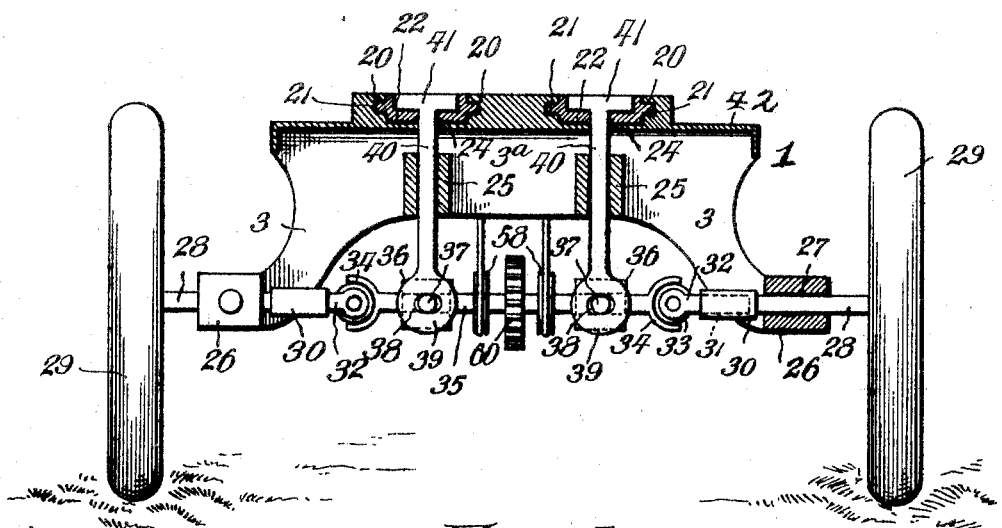
Figure 4:
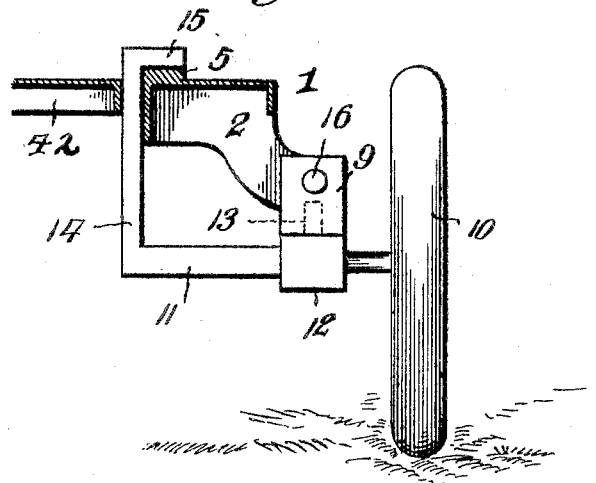

In the drawings, Figure 1 is a longitudinal sectional view of a mechanism constructed in accordance with the present invention. Fig. 2 is a top plan view of my improved mechanism. Fig. 3 is a transverse sectional view of the mechanism taken on line 3 3, Fig. 1. Fig. 4 is a sectional fragmentary view of the truck, showing in side elevation one of the front stub-shafts and a wheel secured thereto. Fig. 5 is a view in side elevation of one of the stationary cam-plates.

Referring to the drawings by reference-numerals, 1 designates the body of the truck, which is provided with pairs of parallel downward extensions 2, formed upon the front thereof, and with pairs of parallel downward extensions 3, formed upon the rear portion. Upon the front of the body of the truck there are secured semicylindrical or segmental cam-plates 4 and 5. Each of the cam-plates is secured against movement upon the body 1. Referring to Fig. 5, it will be seen that the cam-plate 4, which is constructed similarly to plate 5, is provided with a flat or beveled surface 6 and with an upper beveled surface 7 and a lower beveled surface 8. Pivoted between each pair of the parallel front extensions 2 are boxes 9, which are capable of swinging between said extensions. The front wheels 10 are journaled upon the short stub-shafts 11. The stub-shafts 11 are positioned within the boxes 12. The boxes 12 are provided with cylindrical integral extensions 13, which project from the upper portion thereof. The extensions 13 are positioned within recesses formed in the movable boxes 9. It is to be noted that the stub-shafts, owing to the structure of boxes 9, may be both vertically and horizontally adjusted. To obtain this movement of the stub-shafts 11, it is necessary to movably connect the same with the cam-surface of plates 4 and 5. To each of the stub-shafts 11 I fixedly secure an upwardly-projecting arm 14, which is formed with a right-angled extension 15. The right-angled extension 15 engages the upper surface of one of the cam-plates. The right-angled or horizontal extension 15 of the arms 14 are capable of traveling over the cam-surface of plates 4 and 5, causing vertical and longitudinal movement of the stub shafts or axles. Upon referring to Fig. 2 it will be seen that the boxes 9 are secured to the parallel extensions 2 by means of trunnions 16.

Formed upon the rear portion of the body of the truck and directly above the rear axle is a central substantially rectangular extension 17 and parallel extensions or projections 18 and 19. The extensions 17, 18, and 19 are provided with longitudinal grooves 20 for receiving tongue 21, formed upon slidable cam-plates 22. The cam-plates 22 are preferably rectangular in shape and are formed with elongated slots 23. The body portion 1 of the truck is provided with apertures 24, which register with the elongated slot 23 of the adjustable cam-plates 22. The body portion $3^a$, from which project the parallel extensions 3, is formed with transverse parallel guide members 25. The guide members 25 are formed directly beneath that portion of the body of the truck carrying the adjustable cam-plates 22. At the extreme lower end of the parallel extensions 3 are pivotally-mounted boxes 26, each of which is provided with a longitudinal aperture 27 for permitting of the outer sections 28 28 of the rear axle to be supported therein. Each of the sections 28 is provided with a wheel 29. Fixedly secured to the inner end of each of the sections 28 is a box or extension 30, which is provided with a squared recess 31 for receiving the squared end of a section of the rear axle, constituting a shaft 32. The shafts 32 carry balls 33, which are supported within sockets formed upon the ends of the central section 35 of the rear axle. Square-shaped members 36 surround the central section 35 of the rear axle. Said members 36 are provided with trunnions 37, projecting from opposite sides thereof. The trunnions 37 are positioned within elongated apertures 38, formed in the parallel integral extensions 39 of the vertically-adjustable bars 40, which are positioned between the parallel guide members 25 and within the apertured portions 24 of the body and which extend through the elongated slots 23 of the adjustable cam-plates 22. Heads 41 are preferably formed integral upon the upper ends of the bars or vertically-movable members 40. The heads 41 engage the upper beveled surface of the adjustable plates 22. Each of the adjustable plates 22 is provided with central level or flat portions $6^a$ and with beveled portions $7^a$ and $8^a$, similar to the beveled surface of the stationary front plates 4 and 5. It will be obvious that each of the adjustable plates is provided with two surfaces of similar construction, this not being true of the stationary plates 4 and 5. The arms 15 are adjusted within segmental ways 15'. The extensions 17, 18, and 19 constitute guiding means for the adjustable slotted plates 22.

The end portions 42 of the body are connected by a reach 43. The reach 43 comprises a substantially flat member, upon the upper surface of which are formed parallel extensions 44, constituting guiding means for slidable bars or members 45. Flexible means, as cables 46, connect the inner ends of the plates 22 to the rear ends of the bars 45. The outer ends of the plates 22 are connected by flexible means, as a cable 47. The cable 47 passes around revoluble members, as pulleys 48. Flexible means, as a cable 49, passes around revoluble members 50, 51, and 52. The cable 49 is fixedly secured at 53 to the horizontal extensions or heads 15, so that when movement is imparted to said cable said head will be adjusted upon the cam-plates 4 and 5. Synchronous with the adjustment of the extensions or heads 15 plates 22 will also be moved for vertically adjusting the movable members or bars 40.

If the extension or head 15, which engages the plate 5, is moved forward upon the same, the opposite extension or plate 15, engaging plate 4, will be moved rearward, and synchronously with the movement of said extensions or heads 15 the right-hand plate 22 will be drawn forward and the left-hand plate backward for tilting the sections of the rear axle, placing the rear wheels in parallel position at an angle to a vertical plane. Likewise with the movement of the extensions or heads 15 the front wheels will also be positioned in similar manner. Of course the front wheels will in addition to the same be turned upon the boxes 9.

I employ manually-actuated means for causing longitudinal movement of the bars 45. Journaled upon the reach 43 and between the parallel longitudinal projections 44 is a movable cam member 54, which is provided with a grooved roller $54^a$. The roller $54^a$ is of necessity secured in a fixed position relative to the cam member 54. A sleeve $54^b$ is secured upon the front part of the truck and preferably upon the right-hand side of the end portion 42. Positioned within the sleeve $54^b$ is a vertical rod $54^c$, to which is fixedly secured a grooved annular member $54^b$. Passing around members $54^a$ and $54^d$ is an endless belt $54^e$. The cam 54 is preferably grooved at 56 for facilitating the gripping of the traveling cables 57, constituting belts between the same and the bars 45. The cables 57 pass around grooved wheels 58, which are fixedly secured to the central section 35 of the rear axle and over grooved pulleys. Between the grooved wheels 58 a gear-wheel 60 is fixedly secured to the section 35 of the rear axle. Power is applied to the gear-wheel 60 for driving the rear axle and wheels 29.

When it is desired to turn the vehicle to the right, it will be necessary to cause the cam member 54 to engage the right-hand cable 57 and force the same against the right-hand slidable bar 45 sufficiently to draw said bar forward, which will also move the right-hand plate 22 forward and the left-hand plate backward, as well as the right-hand extension or head 15 forward and the left-hand extension or head rearward. When the right-hand head 15 is moved forward, it will raise the stub-axle and tilt the right-hand wheel outwardly, while the opposite wheel will be tilted inwardly through the medium of the stub axle or shaft and its head 15. With the adjustment of the right-hand plate 22, the right-hand rear wheel will be tilted outwardly, while the opposite wheel will be swung inwardly, said rear wheels assuming substantially the same parallel position as the front wheels. In addition to the tilting of the front wheels they will also be adjusted longitudinally. It will be obvious from the foregoing description that while the sections of the rear axle are only adjusted vertically for tilting the rear wheels, the front stub axles or shafts are both vertically and longitudinally adjusted for not only tilting said wheels, but turning the same upon the front boxes 9.

The end portions of the truck are connected by parallel side bars or members 61. Owing to the peculiar structure of the rear axle the central section will be tilted at an angle to a horizontal plane when the front stub-axles are adjusted, and the outer sections 28 of the rear axle will be positioned at an angle to the plane in which the central section 35 lies. When adjustment of the central section of the rear axle is had, the shafts 32 must be slightly adjusted within the squared recess of the boxes 30. The vertically-adjustable members 40 always move in opposite directions when adjusted for retaining the rear wheels in parallel position when the same are tilted. Owing to the structure of the cam-plates 4 and 5 and their coacting members, the front wheels are also retained in parallel position irrespective of the position in which they are tilted.

What I claim is—

1. In a mechanism of the class described, the combination with a truck-body, of a sectional, rear axle carried by said body, wheels fixedly secured to said rear axle, means for adjusting the sections of said rear axle and tilting the wheels thereof in parallel position, stub-axles secured near the front of said truck-body, wheels journaled upon said stub-axles, and cam means for permitting of the longitudinal and vertical adjustment of said stub-axles.

2. In a mechanism of the class described, the combination with a truck-body, rear wheels secured to said body, means for tilting said rear wheels, longitudinally-adjustable front wheels secured to said truck member, and cam means coacting with said front wheels for permitting of the same to be tilted.

3. The combination with a truck-body, of tilting rear wheels secured to said truck-body, front wheels secured to said body, cam-plates carried by said body, and means engaging said cam-plates and coacting with said front wheels for permitting of the tilting and longitudinal movement of the same.

4. The combination with a truck-body, of adjustable front and rear wheels secured to said body, adjusting means for said front and rear wheels comprising stationary and movable cam members, upwardly-extending members engaging said cam members and connected to said wheels, and means for moving said upwardly-extending members and some of said cam members.

5. The combination with a truck-body, of axles provided with upwardly-extending members carried by said truck-body, wheels carried by said axles, and stationary and movable cam members engaging said upwardly-extending member, and capable of causing adjustment of said axles.

6. The combination with a truck-body, of axles carried thereby, wheels carried by said axles, cam-plates carried by said truck-body, and means connecting said cam-plates and axles and capable of permitting of the tilting of said axles.

7. The combination with a truck-body, of a sectional rear axle carried thereby, wheels fixedly secured to said rear axle, stub-axles carried by said truck-body, wheels journaled upon said stub-axles, stationary and adjustable cam members carried by said body, means connecting said adjustable members and rear axle, means connecting said stub-axles and stationary cam members, flexible means connecting said adjustable cam members, connecting means for said stub-axles and stationary cam members, endless traveling means positioned upon said rear axle and the truck-body, and means engaging said endless traveling means, for causing the same to coöperate with the flexible means for moving of the same.

8. The combination with a truck-body, adjustable wheels secured thereto, of adjustable and stationary cam-plates carried by said truck-body, upwardly-extending headed members engaging said cam-plates and coacting with said wheels, horizontal members connecting said adjustable cam-plates and some of said headed members, and cam and endless traveling means for causing movement of said horizontal members.

9. The combination with a truck-body and adjustable axles, wheels carried by said axles, of stationary and adjustable, horizontal cam members carried by said truck-body and means connecting said axles to said cam members, and capable of permitting of the adjustment of said axles.

10. The combination with a truck-body, stub-axles carried by said truck-body, wheels carried by said axles, of cam-plates fixedly secured to said frame, upwardly-extending means secured to said stub-axles and connected to said cam-plates, adjustable cam-plates carried by said truck-body, upwardly-extending means connecting said adjustable cam-plate and sectional axle, and means for adjusting the upwardly-extending means of said stub-axles and the adjustable cam-plates.

11. The combination with a truck-body, of front and rear axles carried thereby, adjustable cam means for moving said axles in a vertical plane, and means for longitudinally adjusting said front axle.

12. The combination with a truck-body, front and rear axles carried by said body, wheels carried by said axles, of endless traveling means passing around said rear axle, and means coacting with said endless traveling means for vertically adjusting said rear axle and causing longitudinal and vertical movement of said front axle.

13. The combination with a truck-body, front and rear axles carried by said truck-body, of endless traveling means positioned upon said truck-body and passing around one of said axles, stationary and adjustable cam means carried by said truck-body, means connecting said axles with said cam means, and means connecting said adjustable and stationary cam means and said axles and coacting with said endless traveling means for adjusting said axles.

14. The combination with a truck-body, front and rear axles carried by said body, wheels carried by said axles, of stationary cam-plates secured to said truck-body, slotted, movable cam-plates carried by said body, means connecting said front axles to said stationary cam-plates, means extending through the slotted portion of said adjustable plates and secured to said rear axle, and means for moving said adjustable plates and said axle-connecting means engaging the stationary plates.

15. In a mechanism of the class described, the combination with a truck-body, of stub-axles secured to said truck-body, a sectional axle secured to said truck-body, wheels secured to said stub-axles, upwardly-extending headed members secured to said axles, means for vertically moving the upwardly-extending members secured to said rear axle, and means for longitudinally and vertically moving said upwardly-extending members secured to said front or stub axles.

16. In a mechanism of the class described, the combination with a truck-body, of a sectional rear axle secured to said body, wheels fixedly secured to the outer sections of said rear axle, stub-axles secured to the front portion of said truck-body, stationary, segmental cam-plates secured in a horizontal position upon said truck-body, each of said cam-plates provided with a flat and beveled surfaces, upwardly-extending, slidable, headed members engaging said cam-plates and secured to said stub-axles, headed members secured to said rear axle, slidable cam-plates carried by said truck-body and engaging the head members secured to said sectional axle, said slidable plate provided with a flat and beveled surfaces, flexible means connecting said slidable plates and the headed members secured to said stub-axles, endless traveling means mounted upon said truck and passing around said rear axle, and means for causing said endless traveling means to coact with said flexible means for adjusting the headed members secured to said stub-axles upon said stationary plates, and causing movement of said slidable plates.

17. The combination with a truck-body, front and rear axles carried by said body, wheels carried by said axles, of extensions projecting at an angle from said axles, and cam means engaging said extensions for permitting of the vertical adjustment of said rear axle and of vertical and longitudinal adjustment of the front axle.

18. The combination with a truck-body, wheels carried thereby, segmental and substantially rectangular cam-plates carried by said body, and means coacting with said cam-plates and wheels for permitting of the adjustment of said wheels.

19. The combination with a truck-body, wheels assembled with said body, of stationary, segmental cam-plates secured to said body, substantially rectangular cam-plates movably mounted upon said truck-body, and means connecting said plates and wheels and capable of permitting of the adjustment of said wheels.

In testimony whereof I affix my signature in presence of two witnesses.

JOHN C. HUGHES.

Witnesses:
E. L. CHAMBERS,
WM. HUGHES.